United States Patent [19]

Remer

[11] 4,328,292
[45] May 4, 1982

[54] PHOTOCURED TUBULAR BATTERY ELECTRODE AND METHOD OF MAKING SAME

[76] Inventor: William R. Remer, Bensalem, Pa.

[21] Appl. No.: 146,797

[22] Filed: May 5, 1980

[51] Int. Cl.³ .............................................. H01M 2/18
[52] U.S. Cl. ................................... 429/140; 429/238; 29/623.5
[58] Field of Search ............... 429/140, 141, 136, 139, 429/238; 29/623.1–623.5; 428/36, 398; 138/107, 170, 178, DIG. 2

[56] References Cited

U.S. PATENT DOCUMENTS

| | | | |
|---|---|---|---|
| 2,305,121 | 12/1942 | Wheat | 429/140 |
| 2,806,076 | 9/1957 | Yamaura et al. | 429/140 |
| 2,896,006 | 7/1959 | Sundberg | 429/140 |
| 2,904,611 | 9/1959 | Duddy | 429/140 X |
| 3,207,632 | 9/1965 | Dickover et al. | 429/140 |
| 3,267,190 | 8/1966 | Malloy | 429/238 X |
| 4,048,398 | 9/1977 | Sundberg | 429/140 |
| 4,144,115 | 3/1979 | Sundberg | 429/140 X |

OTHER PUBLICATIONS

Encyclopedia of Polymer Science and Technology Suppl. vol. 1 "Photocuring" pp. 367–378, 1976, John Wiley and Sons Inc.
Dixon et al., "The Curing of Unsaturated Polyester Resins With Visible Light"; 32nd Annual Conf., 1977, Reinforced Plastics/Composites Instit.–The Society of the Plastics Industry; Sect. 5-D, pp. 1–6.

Primary Examiner—Anthony Skapars
Attorney, Agent, or Firm—Raymond J. Kenny; Edward A. Steen

[57] ABSTRACT

A photocurable tubular electrode (10) and means (30) for fabricating same is disclosed. In one embodiment, a glass braid (66), saturated with a photocurable resin, is partially cured in the presence of visible light. The still flexible braid (66) is then shaped into a sheath (28) and fully photocured. The now rigid sheath (28) is disposed about spaced spines (14) comprising the tubular electrode (10) to form tubes (18) whereupon active material (20) is introduced into the tubes (18). In an alternative embodiment, the partial curing step is eliminated. The resulting sheath (28) displays superior battery performance while simultaneously reducing pollution effluents and energy requirements.

16 Claims, 3 Drawing Figures

PHOTOCURED TUBULAR BATTERY ELECTRODE AND METHOD OF MAKING SAME

TECHNICAL FIELD

This invention relates to storage batteries in general and more particularly to tubular battery plates and a process for making them.

BACKGROUND ART

Secondary batteries employing tubular plate construction generally exhibit superior electrical capacity to weight ratios when compared to similarly sized secondary batteries employing conventional flat pasted grids. This desirable phenomenon primarily occurs because the tube-type electrode design exposes a substantially greater surface area of active material to the electrolyte contained within the battery. Accordingly, since the electrolyte is able to freely circulate about the tubes and through the porous tube sheaths that contain more material, the tubular plate battery is capable of delivering higher capacities. In addition, by securely enveloping the active material in the porous but rigid sheath, the tubular plate battery is better protected from the deleterious effects caused by shocks and vibration.

In brief, tubular plate batteries generally include positive plates characterized by a lead alloy grid having a series of spaced, electrically conductive spines appended to a first electrically conductive cross member. A porous, rigid sheath envelopes each spine to form a plurality of hollow tubes. Each tube, packed with active material, is bottom sealed and connected to adjoining tubes by a second nonconductive cross member. Generally, the negative plates are conventional pasted plates.

As with most secondary battery designs, the positive (tubular) plates and the negative plates are disposed in an alternating spaced relationship within the battery case. A separator is positioned between the plates. Moreover, a number of positive plates and negative plates are electrically ganged together (positive to positive, negative to negative) to form a cell. A plurality of interconnected cells constitute a battery.

Initially, the sheaths were made from slotted hard rubber but over the years, battery designers have turned to woven plastic and braided glass sheaths to provide superior service. Indeed, some present day glass sheaths are made by saturating a glass braid with an alcohol/phenolic solution and then passing the saturated sheath over a shaping mandrel in the presence of radiant heaters to drive off the alcohol in vapor form. After the sheath is rough cut to a desired length (anywhere from about 4 inches [10.6 cm] to about 28 inches [71.12 cm]), the sheath is dipped into a dilute alcohol/phenolic solution to increase resin pick-up whereupon, it is then baked in an oven. The sheath is then dipped for a second time and baked again for approximately a half hour.

It should be readily apparent from the foregoing discussion that this method is both energy intensive and a source of industrial pollution. Moreover, large quantities of expensive solvent are necessary to effect a stiff tube with a specified resin content.

Indeed, the aforementioned process of making tubular sheaths is running into the combined problems posed by: (1) increasingly stringent regulations restricting the amount of air pollution caused by solvent effluents; (2) the constantly escalating cost of energy; (3) the rising cost of expensive organic solvents; and (4) the flammable nature of the alcohol solution.

Clearly a more economic and practical method for manufacturing tube sheaths is desirable.

SUMMARY OF THE INVENTION

Accordingly, there is provided an improved tubular electrode and a method for making same.

Briefly, the glass braid, comprising the sheath, is saturated with a photocurable resin. In one embodiment of the invention, the braid is cured in the presence of visible light whereupon it is shaped into a hollow sheath. In an alternative embodiment of the invention, the braid is first partially cured in the presence of visible light whereupon it is shaped into a hollow sheath. The sheath is then fully cured, again in the presence of light.

After the ultimately cured sheath has been cut to a preselected length, each individual sheath is top sealably disposed about the spaced spines comprising a tubular plate electrode to form a plurality of tubes extending therefrom. Active material is then introduced into these tubes whereupon the tubes are bottom sealed and interconnected by an electrically nonconducting cross member.

PREFERRED MODE FOR CARRYING OUT THE INVENTION

Figure 1:
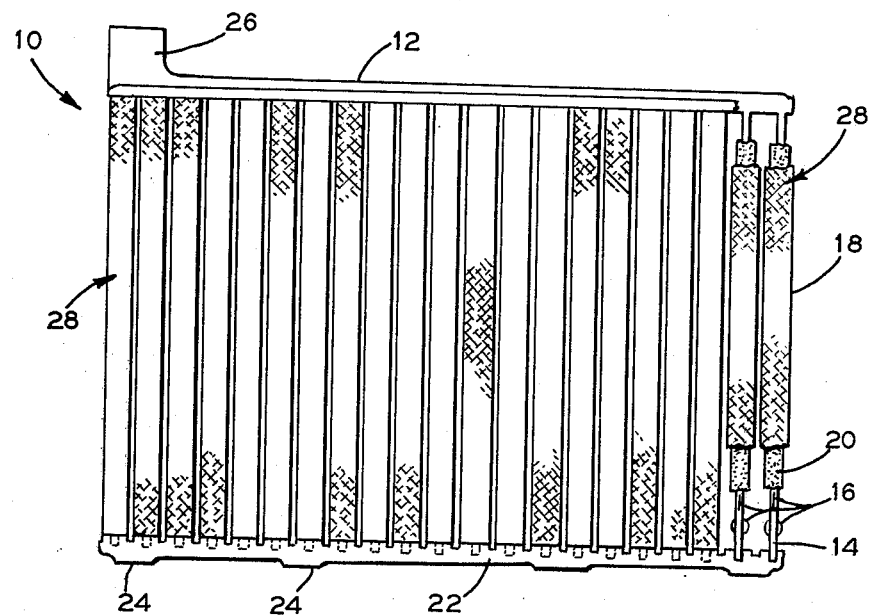
FIG. 1 is a partial sectional elevation of a tubular plate electrode.

Referring to FIG. 1, there is shown a tubular battery plate 10. The plate 10 includes an electrically conductive top cross member 12 and a connecting lug 26. A plurality of spaced, electrically conductive spines 14 extend from the member 12. Each spine 14 includes a plurality of alternating sets of nubs 16. A porous and rigid braided glass sheath 28 envelopes each spine 14 to form tube 18. Active material 20 is packed into the tubes 18. The nubs 16 serve to center the tubes 18 about the spines 14 as well as increasing the surface contact area of the spines 14 with the material 20. Nonelectrically conductive cross member 22 is affixed to the bottom of the tubes 18. Standoffs 24 center the plate 10 relative to the base of a battery case (not shown).

Figure 2:
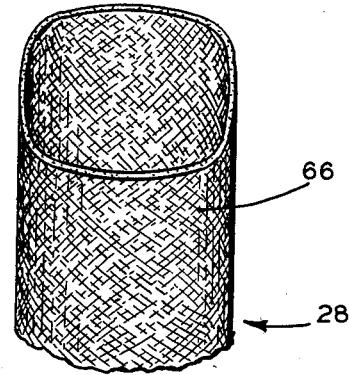
FIG. 2 is a partial isometric view of a glass sheath.

FIG. 2 is a detailed view of the sheath 28. It should be appreciated that the sheath 28, made from glass braid 66, must be sufficiently porous to facilitate uninterrupted electrolyte flow through the tube 18 while simultaneously being rigid enough to both prevent the loss of material 20 and to add to the structural integrity of the tube 18.

In normal commercial practice, a battery employing tubular plate construction contains a series of alternating positive tubular plates 10 and standard negative, flat, pasted plates (not shown). The top cross member 12, the lug 26 and the spines 14 are generally made from lead alloy whereas the bottom cross member 22 and the associated standoffs 24 are made from polyethylene. The active material 20 is lead dioxide ($PbO_2$).

As was alluded to earlier, the present practice of processing glass sheaths 28 for tubes 18 suffers from a number of serious shortcomings. The disclosed processes, on the other hand, substantially reduce the problems posed by pollution, high energy consumption and expensive solvent waste.

Figure 3:
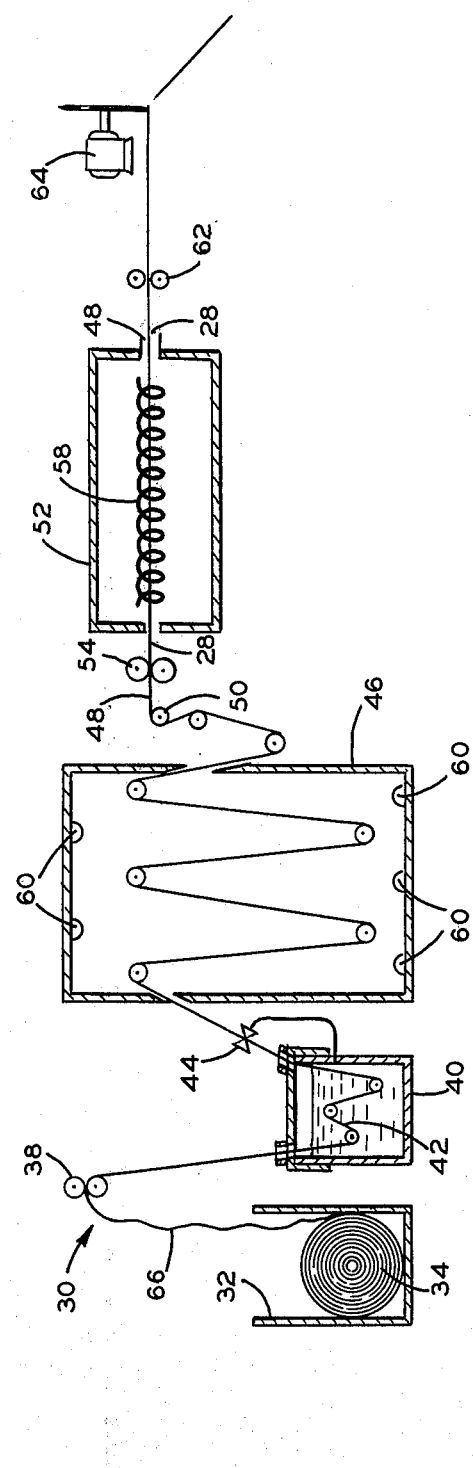
FIG. 3 is a schematic representation of a method for making sheaths.

FIG. 3 is a general schematic representation of a multilight source system 30 for fabricating braided glass sheaths 28. Although the discussion has been geared primarily towards battery applications, it should be understood that the resulting rigid, glass braid may be utilized for other non-battery related applications as well.

Referring now to FIG. 3, there is shown the sheath fabricating system 30. Container 32 houses a spool 34 of flexible glass braid 66. The braid 66, which may be fabricated by any known method, is drawn out of the container 32 by a series of powered wheels 38 and fed into resin impregnating tank 40.

Although the tank 40 may be filled with any suitable photocurable resin capable of withstanding the battery environment, it has been determined that Atlac 382-05K resin (a proprietary photocurable resin manufactured by ICI United States Inc., Wilmington, Delaware). This resin is curable by visible light. Indeed, optimum results may be obtained with a light source of about 4000 Å (the visible violet region). Of course, other resins will cure at different wavelengths.

Preferably, the tank 40 should be light-proof. Moreover, the tank 40 should be equipped with means to provide a tortuous path 42 for the braid 66 to follow. A multipass routing will ensure sufficient resin saturation. Upon exiting the tank 40, excess resin is doctored off the braid 66 by wiper 44 and returned to the tank 40. The braid 66 is then partially cured in multipass chamber 46. The chamber 46 is a closed compartment equipped with xenon lamps 60 (or any visible light source) for resin cross-linking. The interior surfaces of the chamber 46 may be covered with suitable reflective material to fully utilize the light generated by the lamps 60. The light intensity and braid travel speed are selectively controlled so as to precipitate a partial cure of the resin while simultaneously allowing the braid 66 to remain partially flexible. It has been determined that with a xenon light source, satisfactory partial curing may be accomplished in as little as 1.5 seconds. As before, the braid 66 may be forced to undergo a number of passes before the lamps 60 to ensure partial curing.

The still flexible braid 66 is then passed over a crook-shaped mandrel 48 located above pulley 50. The mandrel 48 shapes the braid 66 into a hollow, substantially rectangular sheath 28. See FIG. 2. Of course, elliptical, circular and other sheath 28 shapes may be utilized should the need arise.

The mandrel 48 extends into final curing chamber 52. Accordingly, the sheath 28, "riding" the mandrel 48, is propelled into the chamber 52 by powered drive wheels 54.

The chamber 52 may be provided with either a commercially available helix xenon lamp 58 encircling the mandrel 48 or a series of individual lamps (not shown) similar to those employed in chamber 46. Regardless of the light source, however, the chamber 52 may be further provided with reflective material to enhance the curing effect of the lights. Full curing may be accomplished in about 3.5 seconds.

Since the now fully cured (and rigid) sheath 28 is still on the mandrel 48 when it exits the chamber 52, the desired tubular orientation is maintained. Drive wheels 62 continue to propel the sheath 28 to flying cut-off 64 which cuts the sheath 28 to any preselected length.

In the event that space or other considerations become critical, a single light source system (not shown) may be employed instead of the multilight source system 30. This alternative, albeit slower, system eliminates the need for the chamber 46. Instead, the saturated braid 66 is passed directly from the tank 40 to the crook-shaped mandrel 48 via the pulley 50. The braid 66, as before, is shaped by the mandrel 48 disposed within the chamber 52. Inasmuch as the partial curing step has been eliminated, the chamber 52 would have to be longer to fully cure the sheath 28. Moreover, since the braid 66 has not been semicured, the mandrel 48 will also have to be longer in order to satisfactorily shape the sheath 28 into the desired contour. In summary, the single light source system utilizes the same steps and equipment as does the multilight source system 30, the only difference being that the chamber 46 has been eliminated and the mandrel 48 and the chamber 52 must be sized accordingly.

At a later point in time, the sheaths 28 are placed over the spines 14 to form tubes 18 whereupon active material 20 is introduced into the tubes 18. The tubes 18 are then sealed and rigidly held in place by bottom cross member 22 to form the tubular plate 10. After this step has been completed, the plate 10 may be formed. It should be appreciated that the plates 10 themselves do not have to be cured as is the case with standard pasted grids.

As opposed to the present practice of manufacturing braided glass sheaths 28, the disclosed method results in substantial economic savings. Energy consumption, pollution abatement and solvent replacement costs are reduced. For example, the resin mix is completely utilized. There is no solvent waste since contrary to the standard practice of driving off a portion of the resin to effect a cure, the disclosed methods affirmatively recycle all excess resin to the chamber 42. Moreover, inasmuch as light energy rather than heat energy is employed to cure the resin, considerable energy savings are realized. Moreover, the pollution and flammability problems associated with the use of alcohol solutions are eliminated.

The methods disclosed herein result in high speed tube manufacture and a tube exhibiting superior acid and cell environment resistance.

While in accordance with the provisions of the statutes, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. An improved tubular battery plate of the type having a first electrically conductive cross member, a plurality of spaced electrically conductive spines extending from the first cross member, a glass braid sheath enveloping each spine and forming a tube therewith, active material disposed within the tube, a second nonconductive cross member affixed to and sealing the tube, the improvement which comprises the sheath being fabricated by:
 (a) saturating the braid with a photocurable resin,
 (b) curing the braid by exposing the braid to at least one light source so that the braid becomes rigid, (c) shaping the braid into a sheath, and
(d) sizing the sheath to preselected lengths.

2. The plate according to claim 1 wherein the light source generates visible light.

3. The plate according to claim 2 wherein the light source generates light having a wavelength of approximately 4000 Å.

4. An improved tubular battery plate of the type having a first electrically conductive cross member, a plurality of spaced electrically conductive spines extending from the first cross member, a glass braid sheath enveloping each spine and forming a tube therewith, active material disposed within the tube, a second nonconductive cross member affixed to and sealing the tube, the improvement which comprises the sheath being fabricated by:
  (a) saturating the braid with a photocurable resin,
  (b) partially curing the braid by exposing the braid to a first light source so that the braid remains at least partially flexible,
  (c) shaping the braid into a sheath,
  (d) fully curing the sheath by exposing the sheath to second light source so that the braid becomes rigid, and
  (e) sizing the sheath to preselected lengths.

5. The tube according to claim 4 wherein the first and second light sources generate visible light.

6. The tube according to claim 5 wherein the first and second light sources generate light having a wavelength of approximately 4000 Å.

7. A method for fabricating tubular battery plates, the plates having a plurality of spaced electrically conductive spines extending from an upper cross member, each spine substantially enveloped by a glass braid sheath forming a tube therewith, the method comprising:
  (a) saturating the braid with a photocurable resin,
  (b) curing the braid by exposing the braid to at least one light source so that the braid becomes rigid,
  (c) shaping the braid into a sheath,
  (d) sizing the sheaths to preselected lengths,
  (e) placing the sheaths over the spines to form the tubes,
  (f) filling the interior of the tubes with active material, and
  (g) sealing the tubes with a lower cross member.

8. The method according to claim 7 wherein the light source generates visible light.

9. The method according to claim 8 wherein the light source generates light having a wavelength of approximately 4000 Å.

10. The method according to claim 7 wherein the tube effects a rectangular orientation.

11. The method according to claim 7 wherein the active material is lead dioxide.

12. A method for fabricating tubular battery plates, the plates having a plurality of spaced electrically conductive spines extending from an upper cross member, each spine substantially enveloped by a glass braid sheath forming a tube therewith, the method comprising:
  (a) saturating the braid with a photocurable resin,
  (b) partially curing the braid by exposing the braid to a first light source so that the braid remains at least partially flexible,
  (c) shaping the braid into a sheath,
  (d) fully curing the sheath by exposing the sheath to a second light souce so that the sheath becomes rigid,
  (e) sizing the sheath to preselected lengths,
  (f) placing the sheaths over the spines to form the tubes,
  (g) filling the interior of the tubes with active material, and
  (h) sealing the tubes with a lower cross member.

13. The method according to claim 12 wherein the first and second light sources generate visible light.

14. The method according to claim 13 wherein the first and second light sources generate light having a wavelength of approximately 4000 Å.

15. The method according to claim 12 wherein the tube effects a rectangular orientation.

16. The method according to claim 12 wherein the active material is lead dioxide.

* * * * *

UNITED STATES PATENT AND TRADEMARK OFFICE
CERTIFICATE OF CORRECTION

PATENT NO. : 4,328,292
DATED : May 4, 1982
INVENTOR(S) : William R. Remer

It is certified that error appears in the above–identified patent and that said Letters Patent are hereby corrected as shown below:

In the title page, insert
--- [73] Assignee: Exide Corporation, Philadelphia, Pa. ---.
Column 3, line 20 after ")" cancel . (period, second occurrence) and insert -- produces satisfactory results. --

Signed and Sealed this

Seventh Day of September 1982

[SEAL]

Attest:

GERALD J. MOSSINGHOFF

Attesting Officer

Commissioner of Patents and Trademarks